United States Patent [19]

Newell et al.

[11] 3,997,830
[45] Dec. 14, 1976

[54] SATELLITE BATTERY RECONDITIONING SYSTEM AND METHOD

[75] Inventors: Richard Abbott Newell, Fair Haven; Joel Herman Bacher, Kendall Park; Herbert Walter Bilsky, Trenton, all of N.J.; Patrick Joseph Callen, Yardley, Pa.

[73] Assignee: RCA Corporation, New York, N.Y.

[22] Filed: Nov. 27, 1974

[21] Appl. No.: 527,835

[52] U.S. Cl. .................................. 320/5; 320/14; 320/22; 320/35; 320/39
[51] Int. Cl.² ........................................ H02K 7/00
[58] Field of Search ................................ 320/2–5, 320/13, 31, 14, 15, 9, 35, 20, 39, 40, 48, 22; 244/173

[56] References Cited

UNITED STATES PATENTS

| | | | |
|---|---|---|---|
| 3,454,859 | 7/1969 | Ford et al. ................... | 320/13 X |
| 3,522,507 | 8/1970 | Seiger ........................... | 320/31 |
| 3,740,636 | 6/1973 | Hogrefe et al. ............... | 320/35 X |
| 3,796,940 | 3/1974 | Mauch et al. ................. | 320/14 |

FOREIGN PATENTS OR APPLICATIONS 1,252,006  11/1971  United Kingdom .................. 320/39

OTHER PUBLICATIONS

Dunlop, "Communications Satellite Power Conditioning Systems", PCSC Record, pp. 5–11, (Apr. 20–27, 1970).

*Primary Examiner*—Miller. J D
*Assistant Examiner*—Robert J. Hickey
*Attorney, Agent, or Firm*—Edward J. Norton; Joseph D. Lazar; Michael M. Rickin

[57] ABSTRACT

Reduction of battery effectiveness due to memory effect and unequal cell voltages is minimized by a spacecraft power control system which reconditions the battery preferably just prior to eclipse seasons of a geo-stationary orbit by discharging each battery cell through a network of shunting resistors. Recharging is accomplished by a low power dissipation charging sequence. The load of the system, except for during the eclipse season, is receiving power continuously from the solar cells and during peak load requirements receives supplementary power from the battery cells. During the eclipse seasons, the system power is supplied solely by the battery cells.

8 Claims, 9 Drawing Figures

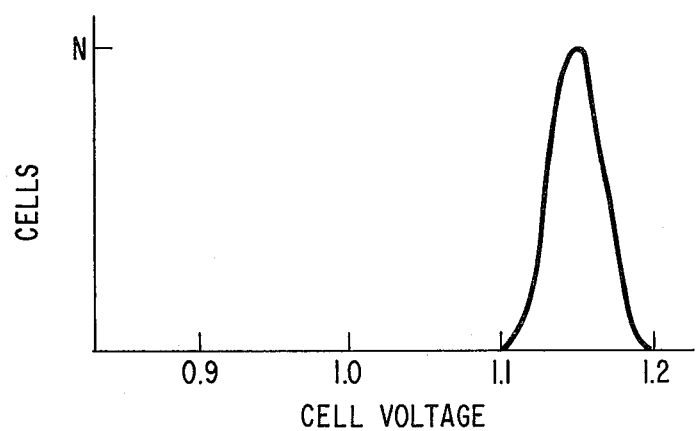
*Fig_1_*
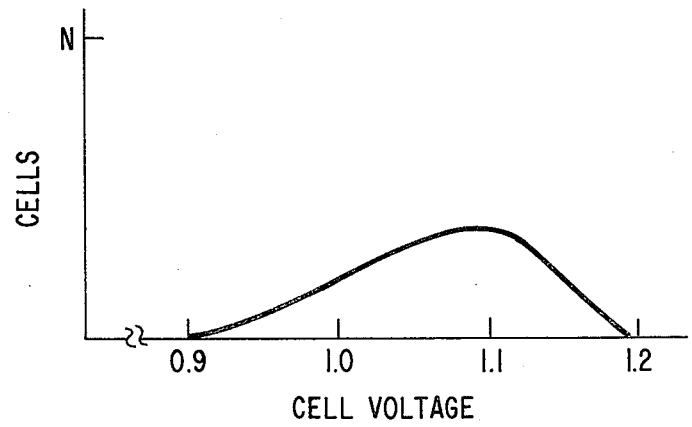
*Fig_2_*
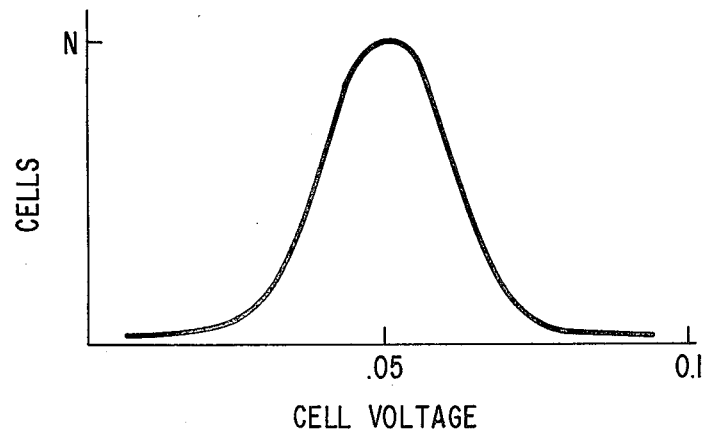
*Fig_3_*

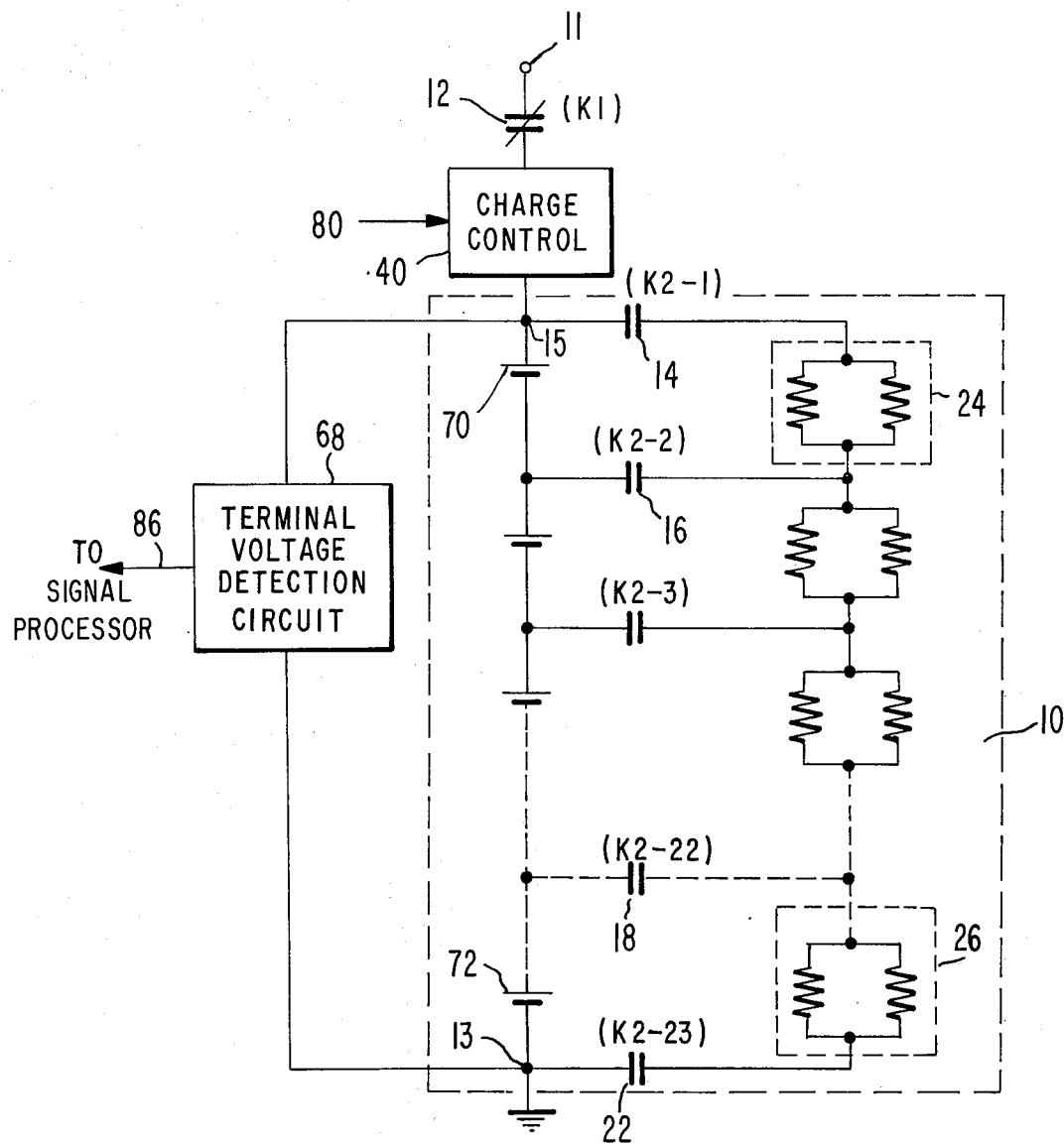
Fig_7.

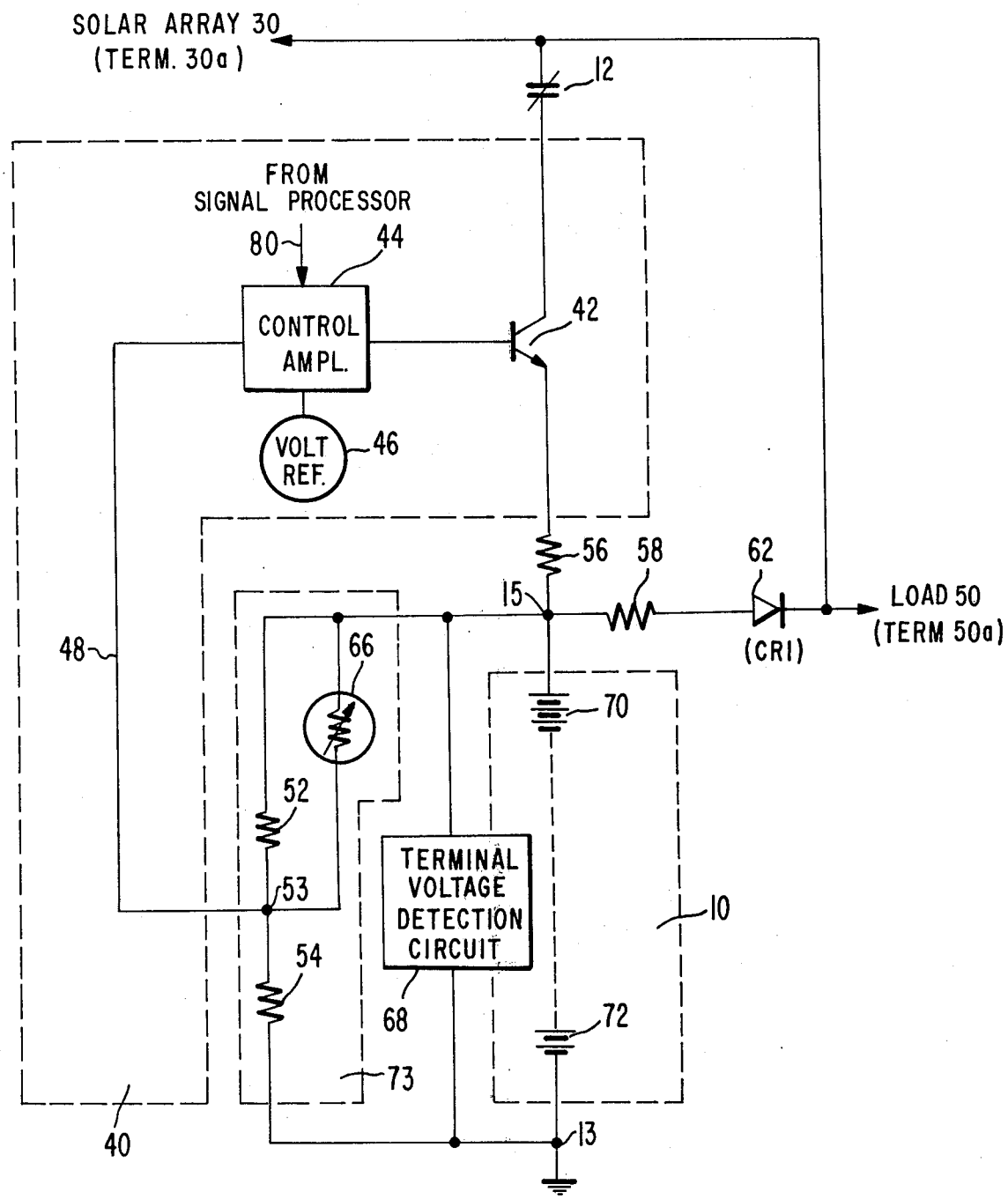

000
SATELLITE BATTERY RECONDITIONING SYSTEM AND METHOD

BACKGROUND OF THE INVENTION

1. Field of the Invention

This invention relates to rechargeable battery power systems for space vehicles. More particularly, it relates to the reconditioning of batteries so as to minimize the reduction of battery effectiveness, due to the memory effect and unequal cell voltages.

2. Description of the Prior Art

Spacecraft normally carry an electrical power subsystem for providing the requisite electrical energy needed to operate the spacecraft subsystems such as: attitude control, communication equipment, sensors, cameras, radiometers, and other scientific instrumentation. Such spacecraft employ solar cells arranged in various types of arrays for converting direct solar energy into electrical energy.

The solar cell delivers power during the sunlight portions of the orbit, but since the subsystems will require power during the dark portions of the orbit or eclipse season, an auxiliary or secondary source of energy must be incorporated in the power subsystem. A storage or rechargeable battery is utilized conventionally as the secondary source.

A secondary battery may develop an undesirable condition that results in the reduction of its output voltage under a variety of circumstances. This battery condition, commonly called the "memory effect," results from repetitive charge-discharge cycles from a continuous trickle charging occurring for long periods of time or from operations at elevated temperatures. The memory effect, to be discussed more fully, hereafter, results in a lowering of cell voltage. Under load, the battery is unable to deliver its rated capacity. Although such circumstances usually occur in geo-stationary synchronous altitude orbits, the memory effect occurs in other types of orbits as well.

The undesired reduction of the battery's output voltage may be minimized, as known, by maintaining the battery both in a temperature controlled environment and by periodically performing a "reconditioning cycle." This reconditioning cycle, to be described more fully hereafter, discharges the stored energy from each cell of the battery and recharges each cell of the battery at a relatively high rate of charge.

One system for in-orbit reconditioning of nickel-cadmium batteries places a resistor across the entire battery and discharges the battery until its voltage is equal to approximately 1.0 volts per cell. Such a voltage discharge limitation is imposed to minimize the probability of cell voltage polarity reversal, a condition caused by mismatch in cell characteristics that are present initially or develop with time. Such reversal can cause an electrical failure or the catastrophic rupture of a cell or group of cells. This cell voltage discharge limitation leads to incomplete discharge of cell stored energy and does not correct unequalized cell voltages thereby reducing the effectiveness of the reconditioning cycle.

Another system for reconditioning batteries is described in U.S. Pat. No. 3,454,854 issued on July, 8, 1969 to F. E. Ford et al. and assigned to the Secretary of the Navy. According to this system when battery voltage falls below a selected level, the battery is removed from the load and the cells are reconditioned by first discharging through a transistor placed across the battery. Individual cell voltages are continually monitored and when the voltage of any cell reaches a low selected level approaching zero volts, the individual cells are then shunted by discharge transistors. The battery is recharged by using a charger, generally comprised of an array of solar cells, by disconnecting the load from the charger thereby permitting the entire charger output to recharge the battery. The requirement to monitor both the battery and cell voltage introduces complexity in the reconditioning system. In particular, if a cell transistor should short-circuit, the associated battery cell will be discharged and be incapable of being recharged. Also, if a cell transistor should open-circuit, the associated battery cell can never be fully discharged thereby leaving the battery with unequalized cell voltages and reduced effectiveness. There is also a shunting effect introduced by the cell transistors in their non-conducting and, thus, high-impedance state, which causes the battery cells to slowly discharge through the impedance of the transistors reducing battery load potential. In addition, battery reconditioning is effected in this system of the patent only when the battery or cell voltage drops below a preselected value, rather than at some preselected time in the satellite's mission. During recharging, the battery is connected to the power source and the load is disconnected leaving the load without any source of power. This condition is intolerable for communication satellites which require the communication's equipment to be operable on a 24-hour basis.

There is a need, therefore, to provide a lightweight and reliable reconditioning system which results in the removal or discharge of substantially all the energy stored in each cell without the possibility of cell polarity reversal. In addition, there is a need to provide for equalization of cell voltages to increase battery life and effectiveness. Further, a system is needed to reduce the possibility, if not to eliminate the possibility, of open- or short-circuits occurring in the cell discharge path.

SUMMARY OF THE INVENTION

According to the present invention, reduction of battery effectiveness due to memory effect and unequal cell voltages is minimized by a spacecraft power control system for reconditioning the batteries in orbit by initially discharging the individual battery cells to a predetermined, very low voltage through a network of resistors switched into shunting the batter cells. After the shunting resistors are switched from across the cells, the battery is then recharged to a predetermined final cell voltage.

BRIEF DESCRIPTION OF THE DRAWING

FIG. 1 is a curve plot of the cell voltage distribution of multi-cell battery at the end of maximum eclipse season.

FIG. 2 is a curve plot of the cell voltage without reconditioning.

FIG. 3 is a curve plot of the cell voltage near the end of reconditioning discharge.

FIG. 7 is a detailed circuit schematic of the reconditioning system discharge portion of the system shown in FIG. 6.

FIG. 9 is a detailed circuit schematic of the reconditioning system charge portion of the system shown in FIG. 6.

DESCRIPTION OF THE PREFERRED EMBODIMENTS

Satellite power subsystems conventionally comprise a solar array in combination with one or more secondary power sources, such as batteries. During the solar illuminated portions of the orbit, the solar array delivers power to the load at normal load levels supplemented by the batteries during periods of peak load. During the non-illuminated portions of the orbit or eclipse periods, the only source of spacecraft power is the batteries. As is well known, there are two eclipse seasons for each geo-synchronous orbit, one occurring at the vernal equinox and the other at the autumnal equinox.

Each eclpse season lasts for approximately 44 days with the daily eclipse duration varying from a fraction of a minute to a 72-minute maximum at the middle of the eclipse season. Prior to entering each eclipse season, according to the preferred embodiment of the present invention, the batteries are reconditioned, whereby each battery enters the eclipse season at full capacity and with cell voltages equalized.

Figure 4:
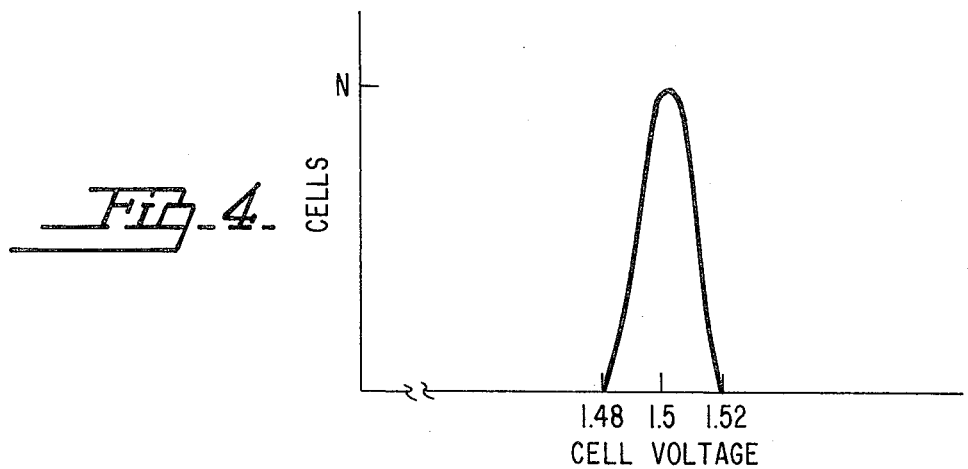
FIG. 4 is a curve plot of the cell voltage near the end of charge.

Before proceeding to the method and system of the embodiment of the invention, a description of the background of the battery reconditioning art will be given. Referring now to FIG. 1, there is shown the cell voltage distribution of a typical nickel-cadmium battery at a temperature of +5° C at the end of a long eclipse. The voltage of any particular cell at the end of a long eclipse, will be within the range of 1.1 to 1.2 volts, the center of the distribution being at a voltage of 1.15 volts or greater. At the end of an eclipse, the battery cells are thus operating after supplying full load requirements. The cell voltage distribution at the beginning of the season is typically about 1.5 volts at +5° C as shown in FIG. 4 to be described. As for the sun illuminated portions of the orbit, the batteries are charging and may discharge, at less than fully rated capacity, to supplement the solar array during periods of peak load. Recharging of the batteries from the solar array automatically occurs during periods of non-peak load since the solar array voltage is greater than the battery voltage. After the battery has undergone a number of such charge-discharge cycles, the cell voltage distribution tends to that shown in FIG. 2. A comparison of FIGS. 1 and 2, shows that as a result of such charge-discharge cycles, the majority of cells no longer operate at approximately the same high voltage and the distribution of cell voltages is considerably wider. When it is desired to operate the battery at rated capacity in this low voltage regime (FIG. 2), the battery is incapable of supplying the ampere hours at the voltage required by the load. This inability of a battery to supply rated capacity when operating in a low voltage regime is commonly called the "memory effect". Memory effect is believed to result from chemical changes occurring at the battery electrodes. For this reason, it is highly desirable to recondition the batteries just prior to each eclipse season. such reconditioning, the fully charged nickel-cadmium battery has a cell voltage distribution near the end of charge as shown in FIG. 4 and the discharge characteristic as shown in FIG. 1. Thus, the cells near the end of charge entering the eclipse season will have substantially equalized cell voltages and full capacity.

Figure 6:
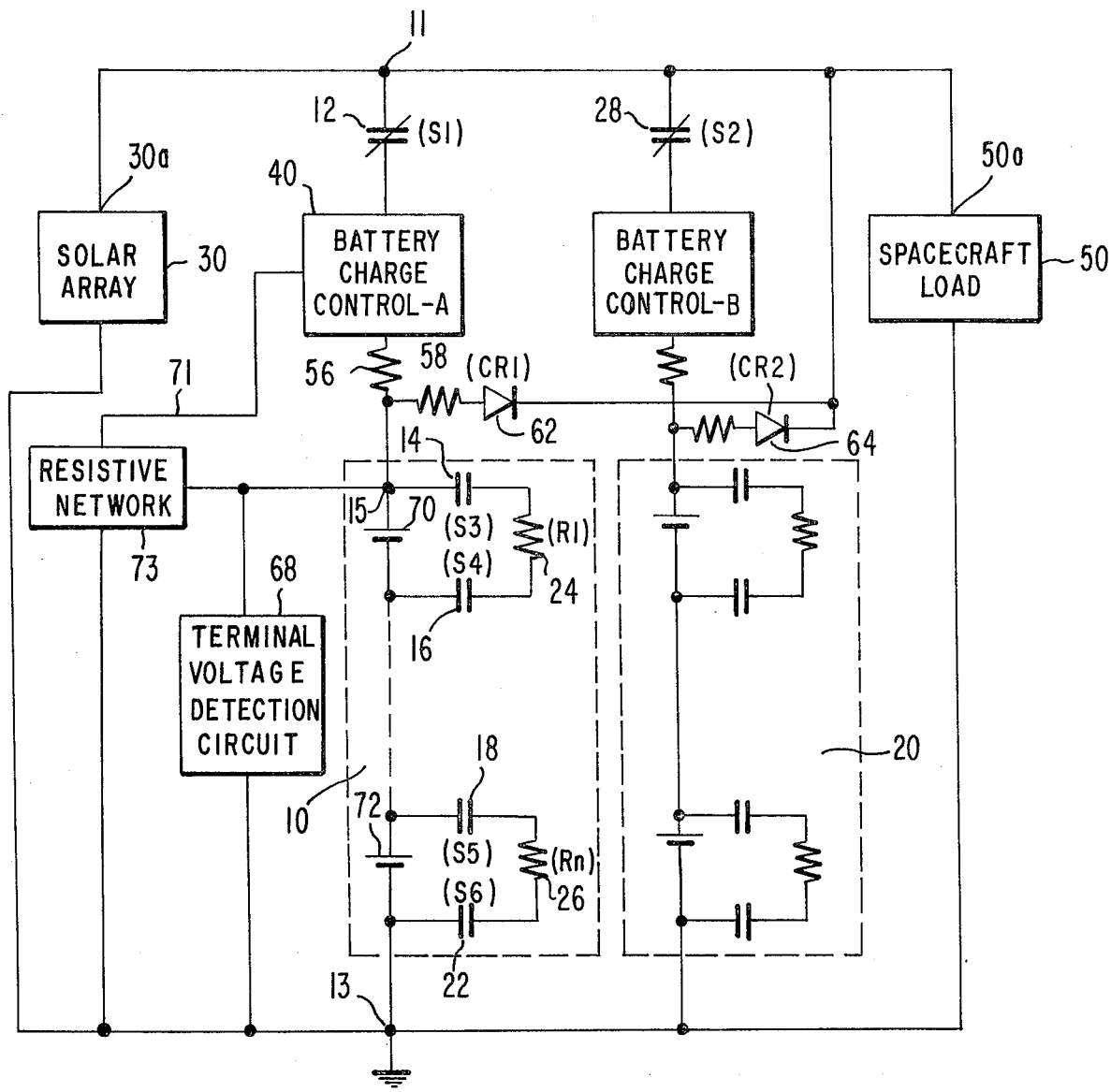
FIG. 6 is a block diagram of a preferred embodiment of a battery reconditioning system.

Referring now to FIG. 6, there is shown a block diagram of the reconditioning system according to the present invention, illustrating, in general, the components of a satellite borne battery system and the manner in which the reconditioning of the cells is achieved. Other features in more detail shown in FIGS. 7-9 will be described later. Batteries 10 and 20, each of which includes a plurality of typically Ni-Cd type cells (70-72), are reconditioned in sequence so that while battery 10 is reconditioning, battery 20, is available to handle spacecraft power requirements.

A command from a ground control (FIG. 8 to be described) causes normally closed (S1) switch 12, which is suitably the contacts of a relay, to open thereby disconnecting battery 10 and its associated battery charge control 40, resistive network 73, and terminal voltage detection circuit 68 from the solar array 30. Simultaneously, switches 14, 16, 18, and 22, (S3, S4, S5, and S6), which are suitably the contacts of a normally open relay, close and thereby connect each of the $R_1-R_n$ resistors 24 and 26 across the associated cells 70, 72, to discharge each of the cells (70-72) of battery 10 at a rate to be described. Switch 28 is arranged to remain in its normally closed position so that battery 20 remains connected to the solar array 30 and spacecraft load 50. Battery 20 which originally was at the same approximate voltage as battery 10, is now at a higher voltage than battery 10 due to the cells 70, 72, of battery 10 discharging through their resistors 24 and 26. Thus, a voltage difference is generated across CR1 diode 62 to reverse bias it. This reverse-biased diode 62 prevents battery 20 from discharging into battery 10 during reconditioning of battery 10. CR2 diode 64 performs a similar function during the reconditioning of battery 20. As the cells 70, 72 of battery 10 discharge through their associated resistors 24, 26, the terminal voltage of battery 10 is monitored by a suitable terminal voltage detection circuity 68. After a predetermined time for the period of discharging battery 10, based on the selected rate of discharge desired, or when the battery voltage reaches a predetermined low level, ground control provides a command signal to effect the opening of switches 14, 16, 18, and 22 and closing switch 12, thereby reconnecting battery 10 to solar array 30. The predetermined time for discharge to be discussed more fully hereafter can be calculated as a function of the cell 70, 72 capacity in ampere hours, the voltage of cells 70, 72 and the resistance of discharge resistors 24, 26.

Battery 10 is now coupled directly to solar array 30 and recharged by current from solar array 30 at a rate under control of charge control 40 sensing the voltage of the charging battery via resistive network 73. After battery 10 has been fully recharged, the reconditioning of battery 10 will have been completed.

Resistive network 73 and terminal voltage detection circuit 68 are shown only for battery 10 for purposes of simplification. It is to be understood that battery 20 is provided with a similar resistive network and terminal voltage detection circuit.

Referring now to FIG. 7, there is shown a more detailed diagram of the battery discharge circuitry for battery 10 between terminals 11 and 13 of FIG. 6. An indentical discharge circuit is associated with battery 20 and each addition of such a battery desired for the system.

K2 relay contacts 14, 16 associated with first cell 70 and contacts 18 and 22 associated with last cell 72, upon ground command effecting operation of the K-1 and K-2 relays (FIG. 8), close and thereby shunt each cell 70, 72 with resistive loads 24, 26 to provide a discharge path respectively across each associated cell. Resistive loads 24, 26 each comprise a combination of two identical resistors in parallel for redundancy so that if one resistor should open-circuit, the other is available to provide the discharge path. The chance of a short-circuit of such resistors is negligible. Further, the use of a pair of positive acting switches to introduce the resistor pairs into and out of shunt with the cells increases reliable operation of the system.

It should be noted that the S1 switch 12 of FIG. 6 is embodied as a normally closed contact switch of the K1 relay. Also switches 14, 16, 18, and 22 of FIG. 6 are embodied respectively by contacts of the K2 relay. Battery 10 as previously indicated is preferably a nickel-cadmium type battery comprising twenty-two cells connected in series.

To simplify the description, the discharge circuitry associated with only two cells 70, 72 of battery 10 has been shown. The other 20 cells, not shown, of battery 10 are provided with the same discharge circuitry comprising a pair of relay switches and a pair of resistors as cells 70, 72.

Figure 8:
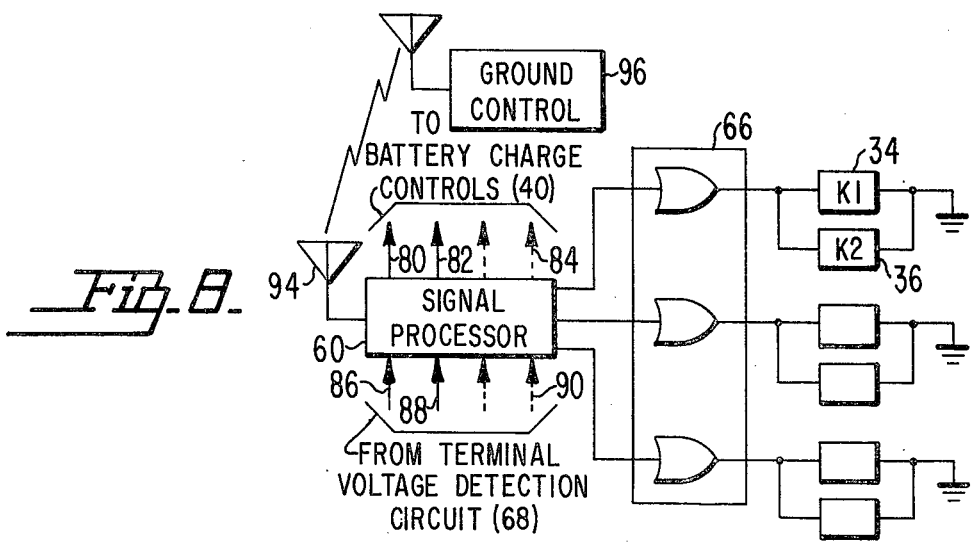
FIG. 8 is a schematic of the signal processor and associated control logic for the reconditioning system.

Reconditioning of the battery 10 is initiated by a ground command transmitted from ground control 96, as shown in FIG. 8. The ground command is received at the spacecraft by antenna 94 and decoded by a suitable signal processor 60 of any known type, providing both encoding and decoding functions including suitable detection of the signals between he satellite and ground command. Logic circuit 66 typically formed of an OR gate associated with each battery responds to a suitable digital signal output of processor 60 to activate the operating coils 34 and 36 of the K1 and K2 relays associated with battery 10. The K1 relay contacts 12 which are normally closed are thus opened thereby disconnecting battery 10 from solar array 30. Contacts 14, 16, 18, 22 of the K2 relay which are normally open, close causing the combination of the two resistors 24, 26 in parallel to be placed across the associated battery cell 70, 72. Two resistors are placed in parallel across each cell as previously indicated so that if one of the pair should open-circuit the other resistor is functionally available to provide a discharge path even if the rate of discharge is slower. Each of battery cells 70, 72 thus discharges through its associated resistor combination 24, 26.

The two resistors comprising each parallel combination 24, 26 are substantially identical in value, chosen to be about 2 ohms each. The total resistance of each combination 24, 26 is thus about 1 ohm. The choice of resistance values for the resistors of each combination 24, 26 is based upon two factors, namely that of power (heat) dissipation and that of the desired time for cell discharge. Prior to the time for reconditioning, the battery will have a cell discharge voltage distribution as shown in FIG. 2 for the conditions described. As indicated previously each cell 70, 72 of the nickel-cadmium battery 10 has a discharge voltage within the range of 0.9 to 1.2 volts. Placing an effective total resistance of 1 ohm across each cell 70, 72 provides a total discharge current of about 0.9 to 1.2 amperes flowing through each resistor pair (24–26). The power that is developed by the current passing through the resistors 24, 26 is about 1 to 1.5 watts each. Resistor combinations 24, 26 are preferably mounted on the side of the battery case functioning as a heat sink for the heat generated by resistors 24, 26. The heat from resistors 24, 26 is removed by conduction to the battery case, resulting in a rise in battery temperature. The battery heat is dissipated by conduction from the battery case to suitable radiators for radiation to space.

The capacity (C) of each cell 70, 72 of battery 10 is about 10 to 12 ampere hours. Thus, with an effective one ohm resistance 24, 26 across each cell 70, 72 approximately 10 to 12 hours is required to discharge each of the cells 70, 72. If the resistance forming the parallel combinations 24, 26 had higher values, for example, 4 ohms each, the total resistance 24, 26 would then be 2 ohms and the resultant power dissipation would halve but the time for discharge would double. However, if each resistor in the parallel combination 24, 26 is 1 ohm, then the resultant power dissipation is doubled and the time for discharge is halved. The choice of 1 ohm for the total cell discharging resistance 24, 26 is then a trade-off or compromise between the time required to discharge the battery toward zero volts and the rise in battery temperature effected by the heat transfer from resistors 24, 26.

Battery cells 70 and 72 discharge until the voltage of each cell is reduced to about 0.05 volts. At such cell voltages, the entire voltage across the terminals 13 and 15 of the 22-cell battery 10 is about 1.1 volts. The typical distribution of cell voltage in a discharged nickel-cadmium type battery is as shown in FIG. 3.

The terminal voltage of the battery is monitored by telemetry to ground by means of the terminal voltage detection circuit 68 which provides a signal over path 86 to signal processor 60 for encoding and transmission to the ground control station 96. Circuit 68 may be of any form for developing a signal proportional to the battery terminal voltage. Such a circuit may be a simple high impedance voltage dividing network having a tapped output for developing a signal for transmission over path 86 to the processor.

The actual discharge operation is terminated in response to an appropriate ground command signal which when received by antenna 94 and decoded by processor 60 gates the selected gate of logic circuit 66 to operate operating coils 34 and 36 for the K-1 and K-2 relays. Relay contacts 14, 16, 18, and 22 are thereby opened disconnecting the resistive loads 24 and 26 from cells 70 and 72 and at the same time K-1 relay contacts 12 are closed reconnecting battery 10 and charge control circuit 40 to solar array 30. Battery 10 is now automatically charged under control of charge control circuit 40 shown in more detail in FIG. 9.

To simplify the circuit, relay contacts 14, 16, 18, and 22 and discharge resistors 24 and 26 associated with cells 70 and 72 of battery 10 have been omitted. Charge control 40 includes control amplifier 44, a voltage reference 46, and transistor 42. The charge control amplifier 40 functions in response to a temperature-compensated signal indicative of the instantaneous battery terminal voltage to change the rate of charging current to the battery cells through the transistor 42 and current sensing resistors 56. Resistor 58 in series with the reverse-biased diode 62 has no effect on the charging flow of current.

Amplifier control 40 is essentially a comparator for comparing the instantaneous battery voltage to a temperature dependent reference, the reference defining, in effect, the desired battery voltage. The amplifier may be formed of an operational amplifier or differential amplifier arranged to be rendered operative on receipt of a signal over path 80 responding to a ground command manifesting the high charge-rate signal. The control 40 responds to the difference in voltage from terminal 53 of the network 73 and the voltage reference 46. The amplifier provides a signal through a suitable buffer amplifier to the base of transistor 42 to control the effective impedance and flow rate of current from the solar panel 30 from terminal 30a through switch 12 and resistor 56 to the battery. One input to control 40 is derived from a resistive network 73 formed of resistors 52, 54 and thermistor 66.

The energy needed to recharge battery 10 is supplied from solar array 30, which is suitably provided with shunt regulators, known in the art, to provide adequate load and charging current. The array supplies about 20 amperes and the shunt regulator maintains the voltage at 35 volts. The voltage of battery 10 in its discharge state is about one volt across terminals 13 and 15. Therefore there is a 34 volt drop across transistor 42, resistor 56 having low resistance and therefore having a negligible voltage drop. If charging of battery 10 were to be started, for example, at a 1 ampere rate, the power dissipation across transistor 42 would be about 34 watts. Transistors are typically not capable of handling such a high power dissipation. According to the preferred form of the invention, control 44 is arranged to provide during normal operation of the system, a bias control signal on transistor 42 that effects continuously a trickle charge rate (C/60) for the battery. When a high charge rate (C/10) is desired, the control 44 in response to ground command changes the transistor (42) drive current to increase the charge rate. This rate is reduced to a low rate if the voltage from network 73, via terminal 53 indicates an excessive voltage level.

Thus, battery 10 is initially charged for about 10 minutes at a trickle charge rate, C/60. For a 10-ampere hour battery 10, the trickle charge rate C/60 delivers 1/6th of an ampere of charging current. The power dissipation in transistor 42 would then be about 5 or 6 watts. At the trickle charge rate C/60, battery 10 terminal voltage rises rapidly and when the voltage, as monitored by ground control via terminal voltage detection circuit 68, reaches the range of about 1.2 volt per cell or for the 22 cells of the battery, about 26.4 volts, the charging current is then changed by ground command to the C/10 or high charge rate. For a 10-ampere hour battery 10, the high charge rate delivers about 1 ampere of charging current. At this time, the voltage drop across transistor 42 is about 10 volts and thus for the C/10 charging rate, the power dissipation is about 10 watts.

Figure 5:
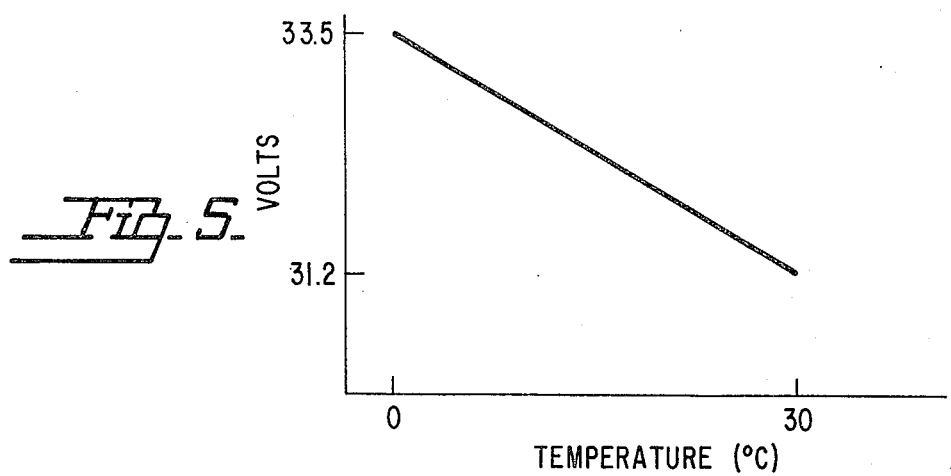
FIG. 5 is a curve plot of the maximum voltage-temperature characteristic.

Resistors 52 and 54 of resistive network 73 comprise a voltage divider network providing a means to monitor the voltage of battery 10. The resistance of thermistor 66 mounted on the housing of the battery senses changes in temperature of battery 10 and varies accordingly. The output of the thermistor 66 and the voltage divider network 52, 54 is arranged to provide an analog control signal. FIG. 5 represents the maximum safe voltage to which a typical Ni-Cd battery should be charged. Network 73 responds to the voltage and temperature of the battery to provide a signal representing those parameters. This signal is used to limit the charging current to battery 10 so as to maintain battery 10 terminal voltage at that level which is safe for a particular battery temperature. If the charging current is not reduced to a lower rate, battery 10, terminal voltage, and internal pressure would increase due to the evolution of hydrogen and/or excess oxygen.

The output signal of network 73 is compared at control amplifier 44 to a reference voltage 46, supplied typically by a temperature compensated 6.4 volt zener diode. Reference voltage 46 provides a fixed voltage against which the signal output of network 73 is compared. Control amplifier 44 compares the signal voltage from network 73 to the reference voltage 46. The difference of those voltages is used to control the base voltage of transistor 42 and thereby control the flow of the low charge rate current to the battery. Thus, the battery will be charged at the rate determined by temperature-voltage characteristic (FIG. 5). For example, for a 22 cell nickel-cadmium battery operating at 0° C, when the battery terminal voltage reaches 33.5 volts, the charging current is reduced to the trickle charge rate (C/60) by the action of network 73 and control amplifier 44, which charge rate is sufficient to maintain at 0° C that terminal voltage. Network 73 is typically arranged such that resistor 52 is 26K ohms, and thermistor 66 has a nominal impedance of 200K ohms. Resistors 56 and 58 are typically 0.1 ohms, while resistor 45 of network 73 is 14K ohms.

To improve still further the reliability of the system, an additional relay to the K2 relay 36 may be used to provide independent switches to connect the resistor pairs $R_1 \ldots R_n$ across the battery cells 70 ... 72. For such an arrangement, a relay K3 is connected in parallel with relay K2. The switches of the K2 and K3 relays are arranged in the resistor circuit so that each resistor in series with one set of contacts of relay K-2 and one set of contacts of relay K-3. In this manner, malfunctioning of one of the relays will not cause a cell to be inadvertently discharged.

A spacecraft power control system arranged implementing the invention provides several advantages. First, a light weight and reliable battery reconditioning system can be used which employs only a single step discharge procedure to remove substantially all the stored energy in each cell without the possibility of cell polarity reversal. This it will be appreciated, is in contrast to prior art reconditioning systems which provide for either incomplete cell discharge or a two step discharge procedure to remove substantially all the energy stored in each cell. Second, the use of two sets of relay contacts to connect each cell to its associated network of shunting resistors reduces if not eliminates the possibility of open or short circuits occurring in the cell discharge path. Third, the use of two (redundant) resistors in parallel as the shunting network for each cell allows the cell to discharge even if one of the resistors should open-circuit. Fourth, the use of a multiple battery power system and the reconditioning of each battery in sequence permits battery power to be available if needed to supplement the solar array. Fifth, at no time during the reconditioning of each battery is the spacecraft load disconnected from the solar array. Sixth, in the preferred form of the invention, reconditioning of the battery system is performed on a scheduled basis just before an eclipse season whereby emergency reconditioning or recharging procedures are avoided.

What is claimed is:

1. A system for reconditioning a secondary battery in a space vehicle, said vehicle having a solar array source of charging current comprising:

a secondary battery having a plurality of cells, a plurality of resistance networks each of said networks comprising a pair of substantially equal resistors wherein each of said networks is associated with a respective one of each of said cells, relay switch means for connecting one of said networks in shunt across its associated cell of said battery, temperature sensitive means for detecting the voltage of said battery and providing a control signal manifesting said battery voltage as a function of the temperature of said battery, means for regulating the flow of charging current from said solar array to said battery at a low charging rate, signalling means for receiving and transmitting signals between said space vehicle and a ground command station, means responsive to a signal from said signalling means manifesting a ground command for changing said regulating means to regulate the flow of charging current to a high charging rate, and means responsive to said control signal from said temperature sensitive means for changing said regulating means to regulate automatically the flow of charging current to said said low charging rate as the voltage of said battery exceeds a critical value for a given temperature.

2. A system according to claim 1 wherein said temperature sensitive means includes a network of two resistors in series connected across said battery, and a thermistor connected across one of said resistors.

3. A system according to claim 1 wherein said relay switch means includes a pair of relay switches connected in series relation between each of said cells and its associated pair of shunting resistors.

4. A system according to claim 3 wherein said relay switch means includes two relay coils, each of said coils arranged to operate a respective one of said pair of relay switches.

5. A system according to claim 1 wherein said regulating means includes a differential amplifier responsive to a reference voltage and said ground command signals for generating a bias signal for controlling said flow rate at either of said low and high rates in response to said ground command signals.

6. A system according to claim 5 wherein said regulating means includes a transistor connected to conduct said charging current from said solar source to said battery, said transistor being biased by said differential amplifier.

7. A method for reconditioning any one of a plurality of secondary batteries in a space vehicle, each of said batteries having a plurality of cells and said vehicle having a solar array source of charging current arranged to provide normally a low charge rate to each of said batteries, comprising the steps of:

disconnecting a selected one of said secondary batteries from said solar array source, discharging the cells of said battery through a pair of resistors connected to said cells by relay switch contacts at a fixed discharge rate, generating a signal representing the voltage of said battery and transmitting said signal to a ground station, transmitting a control signal from said ground station to reconnect said selected battery to said solar source and to charge said battery from said source at a low charge rate, changing the low charge rate to a high rate by ground command when said battery voltage reaches a first selected voltage, sensing the voltage and temperature of said battery and automatically changing the high charge rate to said low rate when said battery voltage reaches a second selected value, greater than said first voltage.

8. A method according to claim 7 including the step of starting said discharging step of a selected battery at least 20 hours before an eclipse season of said space vehicle.

* * * * *